July 10, 1934.     J. A. SIPPRELL ET AL     1,965,673
POWER TRANSMITTING DEVICE
Original Filed May 4, 1931     2 Sheets-Sheet 1
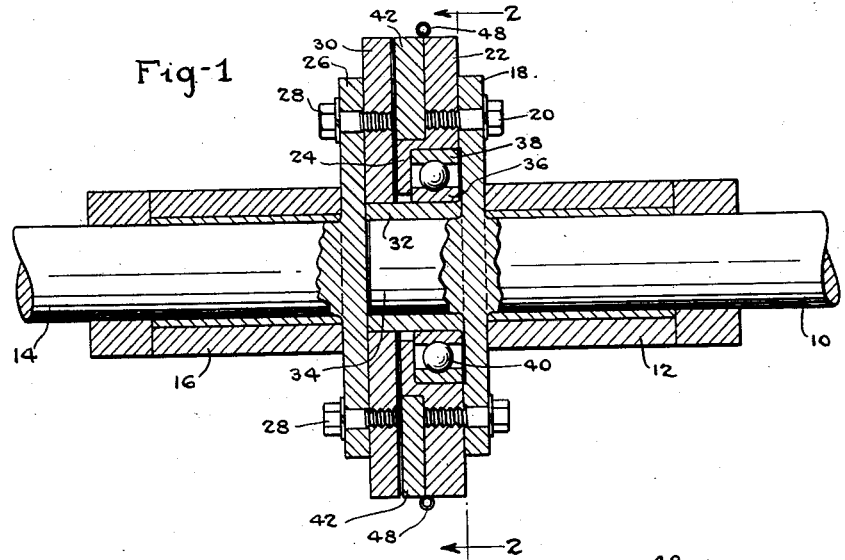
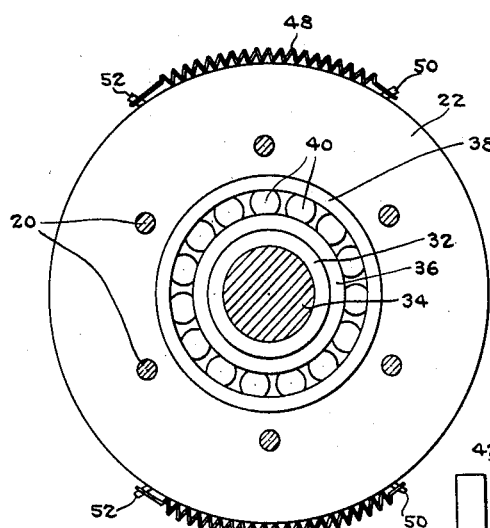
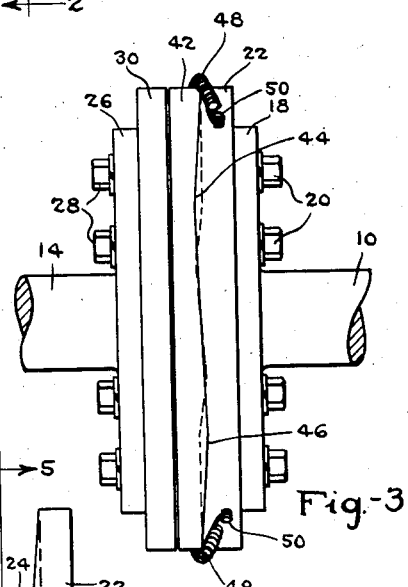
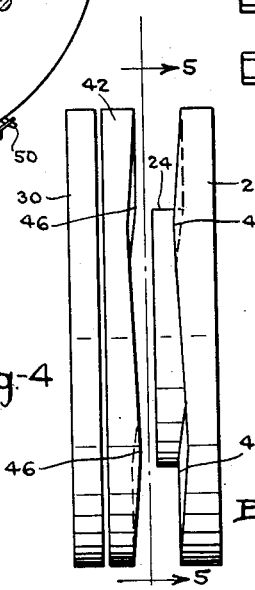
Inventors:
Herbert L. Sipprell,
James A. Sipprell
By Whiteley and Ruckman
Attorneys.

July 10, 1934.　　J. A. SIPPRELL ET AL　　1,965,673
POWER TRANSMITTING DEVICE
Original Filed May 4, 1931　　2 Sheets-Sheet 2

Inventors:
Herbert L. Sipprell.
James A. Sipprell.
By Whiteley and Ruckman
Attorneys.

Patented July 10, 1934

1,965,673

UNITED STATES PATENT OFFICE 1,965,673

POWER TRANSMITTING DEVICE

James A. Sipprell and Herbert L. Sipprell, Minneapolis, Minn.

Application May 4, 1931, Serial No. 534,842
Renewed December 8, 1933

1 Claim. (Cl. 192—43)

Our invention relates to power transmitting devices. An object of the invention is to provide a device of this character in which driven mechanism will be permitted to run free of its driving mechanism when said driven mechanism tends to over-run the power driving impulse imparted thereto by the driving mechanism. The device is in the nature of an automatic clutch in which certain parts in the line of drive between the driving and driven mechanisms are automatically clutched when the driving impulse is applied at a speed ratio sufficient to maintain a co-related speed of the driven mechanism, and which parts are automatically unclutched when the speed of the driven mechanism exceeds the speed which would be imparted by the driving impulse. Another object is to provide a device of this character in which the action just mentioned will be provided for both directions of rotation of the driving mechanism. The device is susceptible of application for driving motor vehicles and various other kinds of machinery.

The full objects and advantages of our invention will appear in connection with the detailed description thereof, and the novel features of our inventive idea will be particularly pointed out in the claim.

Figure 6:
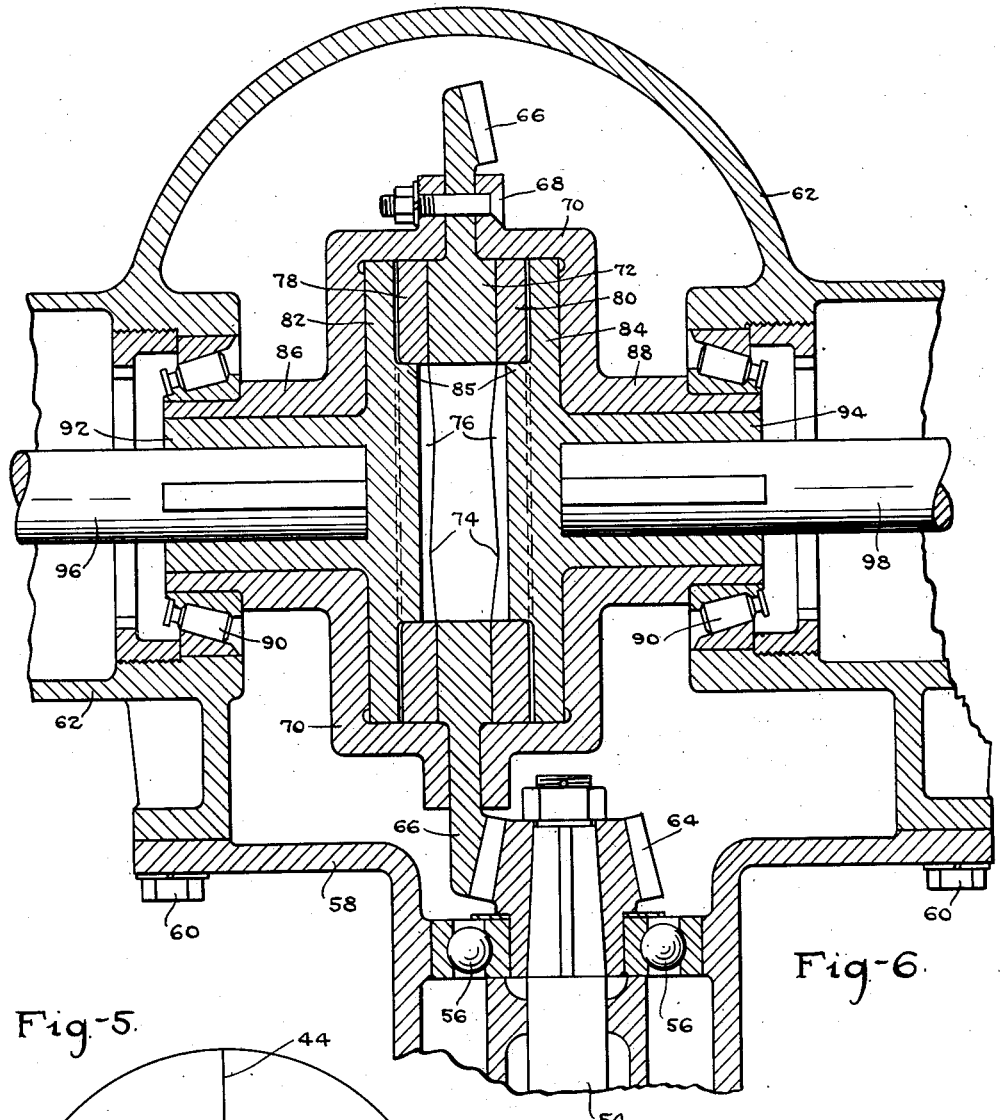
Figure 5:
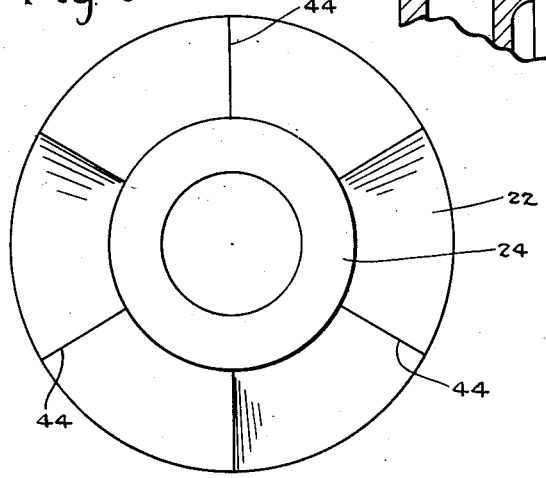

In the accompanying drawings which illustrate two different forms in which our invention may be embodied, Fig. 1 is a view of the device in longitudinal section. Fig. 2 is a view in section on the line 2—2 of Fig. 1. Fig. 3 is a side elevational view. Fig. 4 is a side elevational view showing the parts in dis-assembled condition. Fig. 5 is a view taken on the line 5—5 of Fig. 4. Fig. 6 is a sectional view of a modified form of the invention.

Referring first to the form of invention shown in Figs. 1 to 5, a driving shaft 10 is mounted in a bearing 12 while a driven shaft 14 in spaced alinement with the shaft 10 is mounted in a bearing 16. The end of the shaft 10 adjacent the bearing 12 is provided with a circular flange 18 which is secured by screw bolts 20 to an open center disk 22 having an interior offset annular flange 24. The end of the shaft 14 adjacent the bearing 16 is provided with a circular flange 26 which is secured by screw bolts 28 to an open center disk 30. A cylindrical member 32 is secured at one end as by swaging in the opening of the disk 30 and the other end of the member 32 butts against the flange 18. The member 32 rotatably surrounds a projection 34 in alinement with the shaft 10 and carried by the inner face of the flange 18. The member 32 carries an annular raceway 36, while the interior portion of the disk 22 carries an annular raceway 38, ball bearings 40 being interposed between the two raceways. An open center disk 42 is loosely mounted on the flange 24 and is interposed between the disks 22 and 30. The disk 42 is capable of a slight lengthwise sliding movement since its thickness is a little less than the distance between the disks 22 and 30 when cooperating cam devices now to be referred to interfit with each other.

As will be understood from Figs. 3, 4, and 5, the inner face of the disk 22 is provided with three cams designated 44 arranged at equal intervals around the same. The adjacent or cooperating face of the disk 42 is provided with three similar cams designated 46. In the neutral position of the device shown in Figs. 1 and 3, the cams or projections on each of the disks 22 and 42 fit into the depressions of the other disk. When the shaft 10 is not transmitting driving power to the shaft 14, the disks 22 and 42 tend to assume the neutral position. In order to insure that these disks shall assume this position when the driven shaft 14 overruns the driving shaft 10, two coiled springs 48 located diametrically opposite each other may be provided. These springs are anchored at one end to pins 50 extending out from the periphery of the disk 22 and at the other end are anchored to pins 52 extending out from the periphery of the disk 42. Regardless of which direction the shaft 10 is being turned, the springs 48 will very quickly restore the disks to neutral position when driving power is not being supplied by the shaft 10. The application of this device in the line drive of motor vehicles as well as of various machines is obvious. When a driving impulse is imparted to the shaft 10 from any suitable source of power, the cams 44 of the disk 22 ride for a small portion of their extent upon the cams 46 of the disk 42 and thrust this latter disk into firm engagement with the flat disk 30 carried by the driven shaft so that the latter is caused to rotate. However, when the power is taken off the driving shaft 10, the shaft 14 is free to continue running unless stopped by a brake applied somewhere in connection with the driven mechanism.

This action takes place because the high portions of the cams 44 normally fit into the low portions of the cams 46 and it requires the driving impulse of the shaft 10 to bring the high portions of the cams 44 out of the low portions of the cams 46.

Fig. 6 shows a modification particularly adapted for application to the differential of a motor vehicle. In this form of the invention, 54 designates a driving shaft supported near its end by ballbearings 56 interposed between the shaft and a member 58 secured by bolts 60 to the fixed differential housing 62. A bevel drive pinion 64 secured to the end of the shaft 54 meshes with a bevel gear 66 as is customary in differential mechanisms. The gear 66 is secured by bolts 68 between the parts of a two-part revoluble differential casing 70 so that the teeth of this gear project beyond the periphery of the casing. The gear 66 within the casing 70 has a thickened portion in the nature of an open center disk 72, both faces of which are provided with cams 74 of the same general nature as the cams previously referred to. The cams 74 are adapted to cooperate with cams 76 formed on the faces of two open center disks 78 and 80, one on each side of the member 72. The disks 78 and 80 fit respectively into circumferential recesses formed in disks 82 and 84 mounted in the casing 70. The disks 78 and 80 fit slidably between the peripheral wall of the casing 70 and circular shoulders 85 formed by the recesses in the disks 82 and 84. The disks 78 and 80 are therefore capable of a slight sliding movement since their thickness is a little less than the distance between the disk 72 and the recessed walls of the disks 82 and 84 when the cams 74 and 76 interfit with each other. The two sides of the casing 70 are provided with outwardly extending sleeves 86 and 88 between which and the housing 62, roller bearings 90 are interposed. The disks 82 and 84 carry centrally disposed outwardly extending tubular members 92 and 94 rotatably mounted in the sleeves 86 and 88 respectively. The inner ends of two axle shafts 96 and 98 are keyed in the tubular members 92 and 94. When a driving impulse is imparted to the shaft 54, the casing 70 and the disk 72 are rotated and the cams 74 of the disk 72 ride for a small portion of their extent upon the cams 76 of the disks 78 and 80 and thrust these disks into firm engagement with the disks 82 and 84 to which the axle shafts 96 and 98 are secured.

On account of the action just described, the vehicle may be driven either forwardly or backwardly in a straight path according to the direction of rotation of the shaft 54 and with both wheels driven by the motive power. However, in turning a corner or otherwise deflecting from a straight path of travel, the outer one of the driven wheels of the vehicle will travel more rapidly than the other of said wheels. The overrunning of the outer wheel disengages the cooperating cams by means of which it was driven and allows it to run free without otherwise affecting the traction which will now be supplied by the inner wheel. When the vehicle resumes a straight path of travel, driving action will again be restored to the wheel which had just been permitted to run free. Moreover, if one of the driven wheels of the vehicle is in a soft or slippery spot and starts to spin, the traction afforded by the other wheel will not be affected. Not only does the manner of operation just described make the starting of the vehicle more reliable but it also tends to prevent skidding.

We claim:

A power transmitting device comprising a driving shaft, a driven shaft in longitudinal alinement with said driving shaft, the contiguous ends of said shafts being spaced from each other, an open center cam disk secured to the end of said driving shaft, said disk having an interior circular projection, a transmission disk secured to the end of said driven shaft, a cylindrical member centrally secured to said transmission disk, a projection in alinement with said driving shaft rotatably surrounded by said cylindrical member, ball-bearings interposed between said cylindrical member and said cam disk, and a slidable open center cam disk between said first cam disk and said transmission disk supported for sliding movement upon said circular projection and adapted to be slid into transmission engagement with said transmission disk by rotative movement of said first cam disk.

JAMES A. SIPPRELL.
HERBERT L. SIPPRELL.